GERALD T. SUTTERFIELD
EDWARD J. AMBERG JR.
INVENTORS

BY William T. Fryer III
ATTORNEY

Aug. 6, 1968  G. T. SUTTERFIELD ET AL  3,396,219

MEASURING SYSTEM

Original Filed April 19, 1965　　　　　　　　　　3 Sheets-Sheet 2

GERALD T. SUTTERFIELD
EDWARD J. AMBERG JR.
INVENTORS

BY William T. Fryer III

ATTORNEY

GERALD T. SUTTERFIELD
EDWARD J. AMBERG JR.
INVENTORS

BY William T. Fryer III
ATTORNEY

United States Patent Office 3,396,219
Patented Aug. 6, 1968

3,396,219
MEASURING SYSTEM
Gerald T. Sutterfield, Park Forest, Ill., and Edward J. Amberg, Jr., Beverly Shores, Ind., assignors to Industrial Nucleonics Corporation, a corporation of Ohio
Continuation of application Ser. No. 448,995, Apr. 19, 1965. This application Mar. 16, 1967, Ser. No. 623,776
18 Claims. (Cl. 264—40)

ABSTRACT OF THE DISCLOSURE

The gauge system and method described herein provides for the presentation of a continuous, visual trace of the profile across adjacent sections of a product. In one embodiment, separate gauges measure the thickness of these sections and the gauge signals are processed to read out sequentially on a recorder. The profile of a blown film bubble can be obtained from scanning separate sections of the slit bubble after they are flattened. Several types of presentations can be used, such as a X–Y recorder, circular chart recorder, or strip chart recorder. The system and method described further provides, in embodiment, for the adjustment of the product thickness in the machine direction by combining the signals from the gauges to obtain our average thickness for the two sections, and controlling the machine direction thickness in response to the average thickness.

---

This application is a continuation of our application, Ser. No. 448,995, filed Apr. 19, 1965, and now abandoned.

This invention relates to apparatus and method for gauging a property of a material and presenting the information in a useful fashion. The invention also relates to the control of a process to maintain a desired property value. The particular embodiment disclosed, for illustration of the invention, involves a process for manufacturing plastic, although the invention can be applied to other processes.

The manufacture of plastic is generally accomplished by one of two processes. Plastic is extruded from either a flat die to produce a flat sheet or is blown into a bubble and then flattened. The blown film process, as the bubble technique is frequently termed, presents certain difficulties in measurement and control of the sheet profile and machine direction thickness (thickness in the direction of material movement). Well known techniques such as disclosed in U.S. Patent 3,015,129, assigned to the assignee of this application, can be applied to the measurement and control of a sheet formed by a flat die. But a single gauge scanning a flat sheet does not provide profile information on a sheet formed from a blown film. Prior efforts to solve this difficulty have proposed the measurement of the flattened blown film at an edge, such as in U.S. patent application Ser. No. 309,631, filed Sept. 18, 1963, William R. Palmer, inventor, and assigned to the assignee of the present application.

Frequently, it is just as convenient to slit the flattened bubble and provide means for separately gauging each section of the sheet. In the past this measurement information has been indicated by separate recorders, one for each section of the bubble, or by a two pen recorder that simultaneously traced out the thicknesses of the sheet sections as the gauge means scanned. The presentation was not particularly suited to give an operator the information needed to adjust the process and maintain a uniform sheet profile, and there was no provision for developing a control signal to maintain a desired machine direction thickness.

Before proceeding further, it should be mentioned that the term "thickness," as used in the present specification and claims, is not limited to linear dimension measurement, such as by a caliper. Many gauges, such as nuclear radiation thickness gauges, measure weight per unit area and this measurement is just as useful as an indication of thickness where the material has a substantially constant density. The terms "thickness" and "weight per unit area" are used interchangeably herein.

The present invention has for one of its objects the presentation of information in a fashion useful to an operator.

A further object of the present invention is to measure and indicate the thickness profile of a blown film bubble.

Another object of the present invention is to present the thickness profile of a blown film bubble from measurements taken after the flattened bubble is slit and different gauges measure the thickness of each section.

A still further object of the present invention is to control the machine direction thickness of a blown film bubble from measurements taken after the flattened bubble is slit and different gauges measure the thickness of each section.

These and other objects of the present invention are accomplished in the disclosed preferred embodiment by a method and apparatus that receives information on a property across different sections of a material and presents the information sequentially to provide a continuous indication of the property profile across the material.

The preferred embodiments of the present invention are described with reference to the figures, wherein.

In the several figures, parts having the same function are identified by the same reference numerals.

Figure 1:
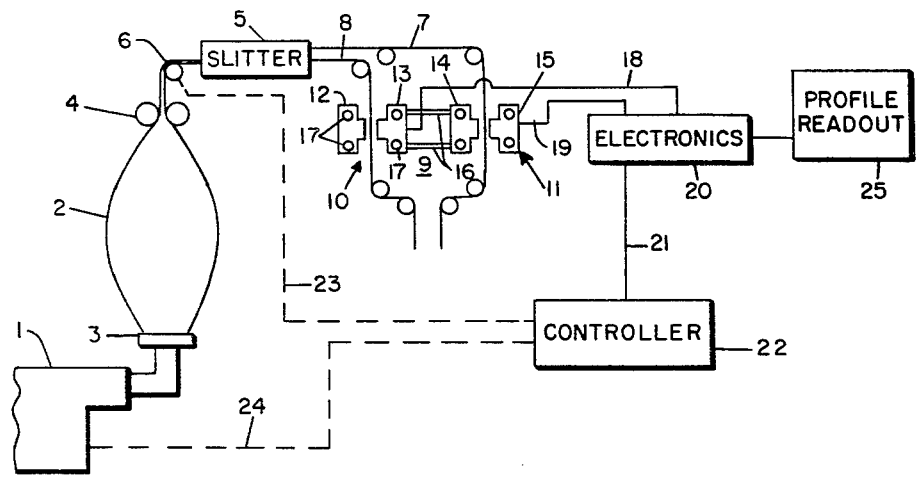
FIGURE 1 is a schematic diagram of a blown film apparatus and means for gauging the profile of the bubble and controlling the machine direction thickness.

A blown film extruder may take several forms, the particular arrangement not being unique to the present invention. In FIGURE 1, the extruder 1, shown only partially, includes the usual hopper, extruder screw (neither one shown) and die 3, for example, which co-act to form a bubble 2. It is important to note that bubble 2 is usually formed by a rotating type of die, which can be of several designs. Alternatively, other elements can be rotated. There usually are means on the die for separately controlling the bubble thickness about its circumference, called die adjustments hereinafter. The details on extruder and die construction are more fully set forth in the prior art and in the above-mentioned U.S. patent application Ser. No. 309,631. An operator can adjust the circumferential thickness of bubble 2 by means of the die adjustments, or other means, if accurate information on the bubble thickness is available. Selective adjustment of thickness around bubble 2 can be accomplished by other well-known techniques, such as heating, air flow, and cooling, for example.

When the bubble circumferential thickness is uniform, the resultant sheet formed from bubble 2 has a uniform upper and lower thickness sections after being flattened by pinch rolls 4. The flattened bubble 2 is passed to a slitter 5, of conventional design, over a take-off roll 6 and the sheet is cut or slit at both edges along its length to form two separate sections 7 and 8 from the flattened bubble 2. Each of sections 7 and 8 is passed over suitable guide rollers to a gauge means 9 which is composed of two miniature O-brackets 10 and 11 mounted back-to-back. Sheet section 8 passes between a radiation source 12 and detector 13 on O-bracket 10, and sheet section 7 passes between a radiation source 14 and detector 15 on O-bracket 11. The source-detector combination is referred to hereinafter as the head.

Miniature O-brackets 10 and 11 are of standard design, such as manufactured by the assignee of the present application, and have their heads in this particular arrangement disposed directly opposite each other and ganged together for movement across the transverse dimension of sheet sections 7 and 8, respectively. Mechanical connections, such as at 16, or a common drive member moves the heads together across the sheet sections 7 and 8. Alternatively, the heads can move in unison by electrical control. The heads move on transverse rods 17. After sheet sections 7 and 8 pass through gauge means 9, they are carried over suitable guide rollers to separate wind-up rolls (not shown). Other types of thickness measuring devices can be used.

Gauge means 9 produces a signal over line 18 from detector 13 that is a function of the thickness in a small measuring area between the source and detector and, as the head scans, the signal varies with the transverse thickness of sheet section 8. Similarly, detector 15 produces a signal on line 19 that is a function of the thickness in a small measuring area and, as the head scans, the signal varies with the transverse thickness in the cross-machine direction of sheet section 7. These signals are combined in electronics 20 to provide (1) a signal on line 21 that is a function of the average thickness of sheet sections 7 and 8, and (2) a continuous readout of the thickness profile of the sheet sections and, consequently, the thickness profile of bubble 2.

The average signal over line 21 is coupled to an automatic controllers 22 that actuates a suitable adjustment, such as take-away speed (control of driving motor indicated by dotted line 23 to take-off roll 6), or extruder pump speed (control of extruder pump motor indicated by dotted line 24). Each of these adjustments has the effect of uniformly changing the sheet thickness in the machine direction and controller 22 maintains this thickness at a desired value.

The profile readout is provided by a suitable indicator means, represented by a readout device 25. The presentation may be of several forms, but the object of each is to indicate the profile of the bubble and thereby provide an operator with information on the need for adjustment of the bubble circumferential thickness to produce a uniform profile thickness in each of sheet sections 7 and 8. Preferably, this presentation should be continuous.

Figure 2:
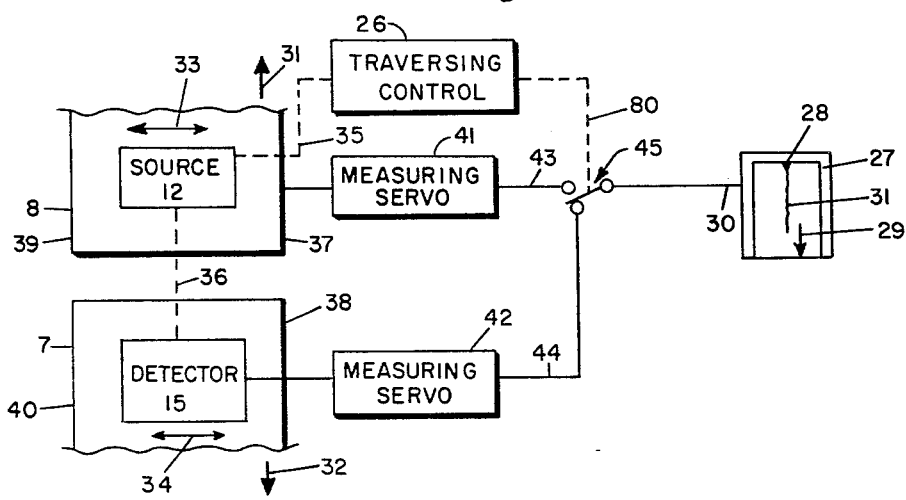
FIGURE 2 is one embodiment of apparatus for presenting a continuous profile of the bubble on a strip chart recorder in accordance with the present invention.
Figure 3:
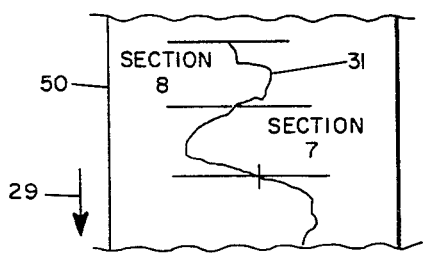
FIGURE 3 is an enlarged view of the presentation for the recorder of FIGURE 2.

The heads of O-brackets 10 and 11 co-act with conventional switches on transverse rods 17 to control their movement. These limit switches (not shown) are located at each of the sheet section edges so that the heads scan only the sheet section. Other movement of the heads can be provided, such as for standardization, and these movements, including the repeated scan back-and-forth across the sheet sections 7 and 8 are provided by a traversing control 26 (FIG. 2). The heads need not move simultaneously, but movement of one can be delayed with the signal from the other head stored for replay later.

In the embodiment of FIG. 2, the profile readout device 25 is a strip chart recorder 27 of conventional design, having a single pen or marker 28. The chart moves in the direction indicated by arrow 29. Recorder 27 receives an input signal on line 30 which controls the movement of pen 28 in a direction transverse to the direction 29 to produce a trace 31.

For convenience and clarity of presentation, the sheet sections 7 and 8 are rearranged in FIGS. 2, 4, 6, and 7 from the arrangement shown in FIG. 1. In FIG. 1 sheet sections 7 and 8 are in parallel planes. In FIGS. 2, 4, 5, and 7 sheet sections 7 and 8 have been shown in the same plane, the movement direction of the sheets as they pass detector 13 and source 14 are indicated by arrows 31 and 32, respectively, while the direction of scanning movement of the heads is indicated by arrows 33 and 34, respectively. The scanning movement of the heads, directed by traversing control 26 (the drive connection being represented by dotted lines 35 and 36), begins at the edges 37 and 38, respectively, and continues at a uniform speed to the opposite edges 39 and 40, respectively. After reaching edges 37 and 38, the heads scan at uniform speed back to edges 37 and 38. The back-and-forth scan is repeated automatically. The limit switches, as mentioned above, are part of the traversing control 26 to provide the automatic, repeating back-and-forth scan.

Traversing control 26 also serves another function. The detectors 13 and 15 are coupled to measuring servos 41 and 42 which provide output signals on lines 43 and 44, respectively, which are a function of the sheet thickness between the source and detector. These signals are coupled alternately or sequentially by a switch 45 to a recorder input line 30. The timing of the connection or switching action is provided by traversing control 26 (as indicated by dotted line 80), such that the signal from detector 15 is coupled to recorder 27 when the heads move from right-to-left (as viewed in FIG. 2), and immediately at the commencing of the return scan, from left-to-right, the limit switch actuates a relay (not shown) in traversing control 26 to reverse switch 45, connecting recorder 27 to the signal detector 13. The switching action is repeated as the heads scan back and forth, to produce a continuous trace 31 on recorder chart 50, showing the profile of bubble 2. If desired, suitable indexing markers can be placed on the chart at the beginning and end of the head scan in each direction. Also, these markers can be referenced to the position of the adjustments on die 3, for the operator's convenience, compensating for transport lag, in the manner described in the above-referenced U.S. patent application Ser. No. 309,631.

Figure 4:
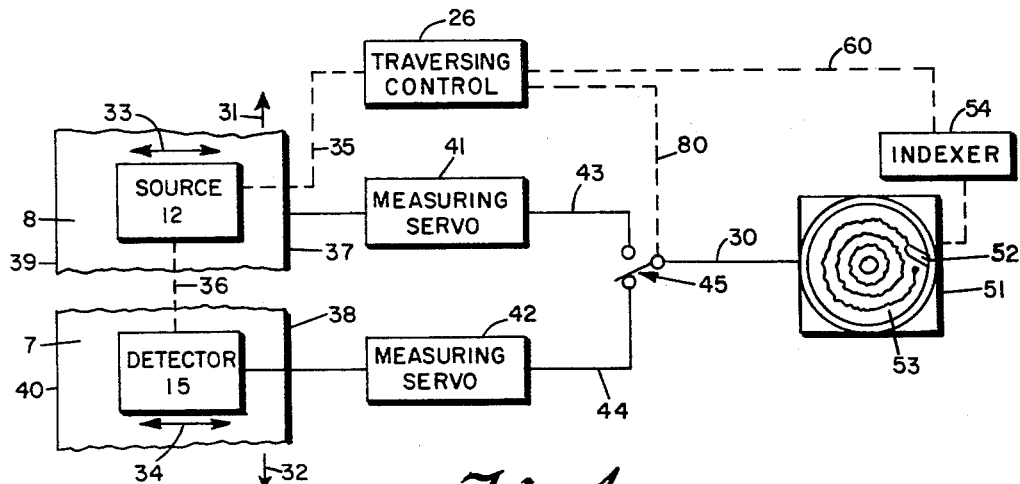
FIGURE 4 is another embodiment of apparatus for presenting a profile of the bubble on a circular chart recorder in accordance with the present invention.

In the embodiment of FIG. 4, the same gauging means 9 is employed, the principal difference from the embodiment of FIG. 2 being the form of presentation. Profile readout is indicated on a circular chart recorder 51 of standard design having an input connected to line 30. A signal at input 30 moves the marker arm 52 radially from the center of the chart 53 which rotates. On the first back-and-forth scan by the heads, marker arm 52 is positioned at a desired radius by an indexer 54, usually a part of the recorder 51, and a circular trace is drawn. The speed of the chart rotation is such that in one scan across the sheet sections, 180° of chart rotation occurs. On the return scan the other 180° rotation occurs to produce a 360° trace that shows the profile of bubble 2. This form of presentation is particularly desirable, since the position of the die adjustments can be placed on the chart 53 and the circular presentation arrangement corresponds to the circular arrangement of the die adjustments.

Prior to the next back-and-forth scan of the heads, indexer 54 shifts the position of pen arm 52 to another radius at a distance from the previous trace to prevent overlap, and a second trace is recorded. Indexer 52 is actuated by traversing control 26 at the end of each back-and-forth scan (the control action being represented by dotted line 60). A large number of traces can be displaced simultaneously in this manner to further aid the operator in determining the effectiveness of his adjustments. This form of presentation can serve a very useful purpose when it is known that a profile non-uniformity exists.

Figure 5:
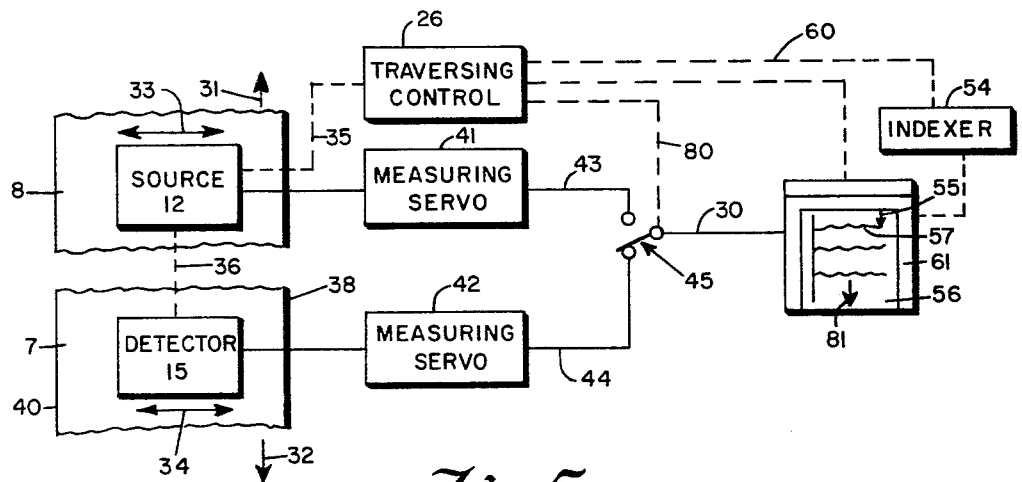
FIGURE 5 is another embodiment of apparatus for presenting a continuous profile of the bubble on an X–Y recorder in accordance with the present invention.
Figure 6:
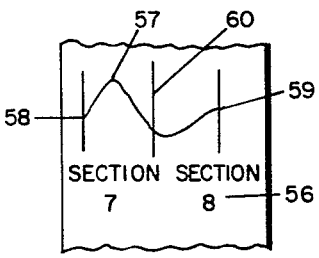
FIGURE 6 is an enlarged view of the presentation for the recorder of FIGURE 5.

The embodiment of FIG. 5 includes gauge means 9 and the same basic arrangement previously described. The profile readout is provided by an X–Y recorder 61 of standard design having an input connected to line 30. A signal on line 30 moves the chart 56 along its length, indicated by arrow 81. The movement of pen 55 across chart 56 follows the movement of the scanning heads in a predetermined manner. Starting at the left, as viewed in FIG. 5, pen 55 moves half-way across chart 56 in one scan across the sheet sections 7 and 8, then switch means 45 contacts the other detector to recorder 61 and pen 55 moves to its far right position at the end of the return scan to complete trace 57. Trace 57 is a complete profile of bubble 2. As shown in FIG. 6, trace 57 is continuous from the start at 58 to its termination at 59. At the center of trace 57, represented by line 60, the signal from the other head is switched to recorder 61.

Recorder 61 has the standard indexer 54 which is actuated in response to a completed trace and the completion of the scan back-and-forth of the heads, to move the chart 56 to a position for a new trace. Each trace represents a profile scan of bubble 2, and the operator can observe the effectiveness of his adjustments. The location of the die adjustments can be marked on recorder chart 56, with provision being made for transport lag compensation.

Figure 7:
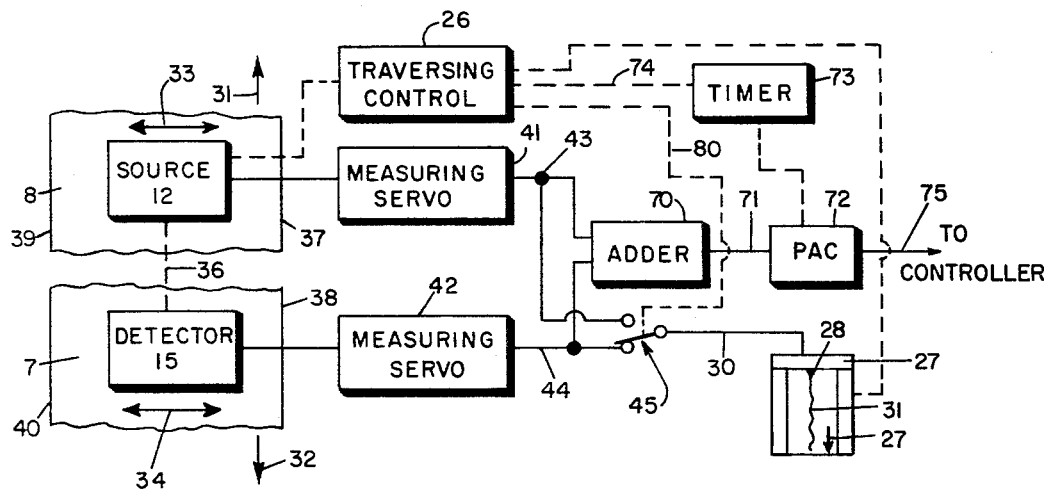
FIGURE 7 is an embodiment of apparatus for presenting a continuous profile of the bubble on a strip chart recorder and for controlling the machine direction thickness of the sheet.

Frequently, there is a need for both a profile readout and control of the process forming the material being measured. In the embodiment of FIG. 1, the electronics 20 provided such a control signal. The thicknesses of the sheet sections 7 and 8 in the cross-machine direction were averaged and any deviation from a desired thickness was corrected for by an appropriate adjustment. In FIG. 7 is illustrated a specificie example of a gauging means and electronics arranged to provide profile readout and machine direction thickness control.

The profile presentation is on strip chart 27, described in connection with FIG. 2. The movement of the heads is the same as in the other embodiments, except that there is a short dwell period at the end of one scan, i.e. at either edges 38 and 37, or 39 and 40, while the electronics 20 readouts the average of the signals from the last scan across the sheet. The signals on lines 43 and 44 are coupled to an adder 70, having an output on line 71, during the scan from edges 37 and 38 to 39 and 40. The output of adder 70 on line 71 is coupled to a profile average computer (PAC) which includes a timer 73. The integration time is set by timer 73, initiated by the commencement of a scan across sheet sections 7 and 8 (control action represented by dotted line 74). The integration period ends after a predetermined time, generally the period required to complete the scan. Traversing control 26 actuates switch 45, in the manner previously described, to present sequentially the thickness across one section and then the other section. After the presentation of one complete profile of bubble 2, the heads momentarily dwell at one edge, during which time the average signal PAC 72 is coupled over line 75 to controller 22 (FIG. 1), as described above. A transport time delay (not shown) is built in to prevent further correction until the change in machine direction thickness can be measured. PAC 72 is reset and readied for the next computation. The average control signal need not be obtained after every scan, for only a few corrections are usualy required.

Figure 8:
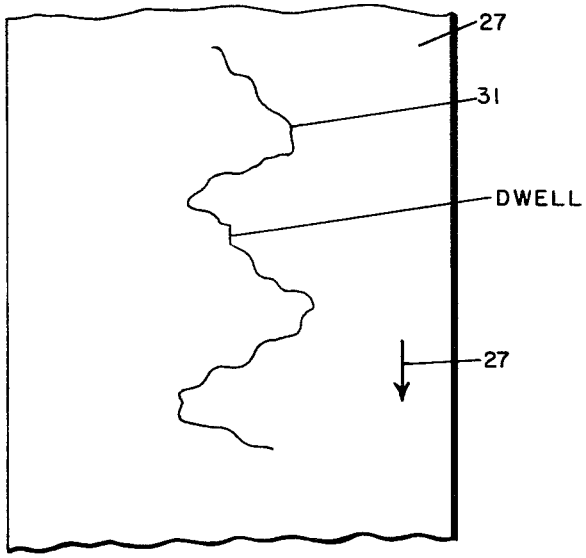
FIGURE 8 is an enlarged view of the presentation for the recorder of FIGURE 7.

The resultant trace 31 is shown in FIG. 8, wherein two complete profiles are presented, separated by a straight line, representing the dwell period.

The importance of the present invention to blown film apparatus is apparent, and there are unique and specific advantages in its application to plastics manufacturing.

The specific embodiments that have been disclosed are merely examples of the numerous apparatus designs that can perform the method of the present invention. Different types of manufacturing apparatuses can be equipped with a gauging means to readout a profile where measurements must be taken with separate gauges. The arrangement of the gauging means can take several forms. A variety of different property measurements are feasible, with the use of the appropriate gauges. The electronics can be designed in several ways and different types of recorders can be accommodated. For example, the recorder can be a cathode ray tube and circuits can be designed without difficulty to present the information as a continuous, circular pattern, similar to the circular chart presentation of FIG. 4.

It is also apparent that a system can be arranged to combine several of the aforementioned forms of information presentation. For example, the same signals from the detectors 13 and 15 can be switched to both a strip chart recorder and an X–Y recorder, to simultaneously present both profile traces in the manner described above for each of these recorders. Also, a circular chart recorder can be added to provide three presentations. Any one or combination of these recorders, or other forms of presentation, can be switched in at the operator's option, in accordance with the various modifications or arrangements of the present invention.

Changes, modifications and other embodiments of the present invention are to be considered within the scope of property rights protected by the appended claims.

What is claimed is:

1. A gauge system for measuring the thickness of plastic produced by a blown film extruder having a bubble which is split into two sheet sections, and having means for adjusting the bubble circumferential thickness, comprising:
   a first gauge means arranged to scan across one of said sheet sections for measuring thickness,
   a second gauge means arranged to scan across the other of said sheet sections for measuring thickness,
   means for traversing said first and second gauge means to provide said scanning movement,
   means coupled to said first and second gauge means for sequentially reading out the thickness of each of said sections to present a continuous thickness profile of said bubble.

2. A gauge system for measuring the thickness profile of a plastic bubble produced by a blown film extruder, said bubble being split into two sheet sections, and having means for adjusting the bubble circumferential thickness, comprising:
   a first gauge means arranged to scan from edge-to-edge across one of said sheet sections for measuring thickness,
   a second gauge means arranged to scan from edge-to-edge across the other of said sheet sections for measuring thickness,
   means for traversing said gauges in unison back-and-forth across said respective sheet sections to provide said scanning movement,
   indicator means coupled to said gauge means for sequentially presenting the thickness of each of said sheet sections after each back-and-forth scan of said sheet, to indicate the profile of said plastic bubble.

3. A gauge system, as described in claim 2, wherein said indicator is an X–Y recorder having one of its inputs alternately coupled to said first and second gauges and the other input alternately responsive to the position of said first and second gauges, respectively, to record a continuous trace comprising the thickness across said one section followed by the thickness of said other section.

4. A gauge system, as described in claim 2, wherein said indicator is a strip chart recorder having an input which is alternately coupled to said first and second gauges to record a continuous trace presenting the thickness across said one section followed by the thickness of said other section.

5. A gauge system, as described in claim 2, wherein said indicator is a circular chart recorder having its input alternately coupled to said first and second gauges to record in 360 degrees rotation of the chart a continuous trace comprising the thickness across said one section followed by the thickness of said other section.

6. A method of presenting information from two gauges that measure a property of adjacent sections of a product, comprising the steps of:
  scanning said sections with separate gauges,
  sequentially transmitting the measurements from said gauges to a device to present a continuous visual indication of the property profile across said adjacent sections of said product.

7. In combination with a blown film apparatus for manufacturing plastic sheet, wherein the bubble is slit to form two sheet sections that can be separately gauged and wherein said apparatus has means for uniformity adjusting the thickness of said sheet in the machine direction, a separate thickness gauge means for scanning each of said sections, means for averaging said thickness measurements from both of said gauge means, and means for controlling said adjusting means in response to said averaging means to maintain a substantially uniform sheet thickness in the machine direction.

8. Apparatus for measuring the profile of a blown film bubble produced by a machine comprising an extruder, a die for forming said bubble, means for flattening said bubble into a sheet, means for slitting said sheet at each longitudinal edge, to form two separate sheet sections, a first gauge means disposed adjacent one of said sheet sections and mounted for movement to scan said one sheet section transverse of the direction of movement of said one sheet section, a second gauge means disposed adjacent said other sheet section and mounted for movement to scan said other sheet section transverse of the direction of movement of said other sheet section, each of said first and second gauge means producing a signal that is a function of the thickness of the adjacent sheet section, means for moving said first and second gauge means in unison, means for controlling said moving means to cause said first and second gauges to scan back-and-forth across said respective sheet sections, means for indicating the magnitude of a signal and presenting a visual trace at least temporarily permanent, means coupled to said first and second gauge means to selectively couple said signals from said first and second gauges to said indicating means to present a continuous trace representing the thickness profile of said bubble, said coupling means being responsive to said control means and connecting said first gauge signal to said indicating means while said first and second gauges means are scanning across said respective sheet sections in one direction and connecting said second gauge means to said indicating means while said first and second gauge means are scanning across said respective sheet sections in the opposite direction.

9. Apparatus, as in claim 8, wherein said indicating means is an X–Y recorder, said coupling means connecting said first gauge means to said recorder at the commencement of a scan across said respective sheet sections and until said scan is completed, with the recorder marker initially substantially at one side of said chart, said recorder marker being then positioned at substantially the middle of the chart, when said scan is completed, and coupling said second gauge means to said recorder at the commencement of the return scan, said recorder marker being positioned substantially at opposite sides of said chart at the end of said return scan.

10. Apparatus, as described in claim 8, wherein said machine is controlled to maintain a desired machine direction sheet thickness, and including computing means coupled to add said first and second gauge signals to produce a third signal representing the integrated value of said added signals over a predetermined time period corresponding substantially to the time required to complete a scan across said respective sheet sections, and controller means coupled to receive said third signal and to adjust said machine to maintain a desired machine direction thickness.

11. Apparatus, as described in claim 8, wherein said indicating means is a strip chart recorder.

12. Apparatus, as described in claim 8, wherein said indicating means is a circular chart recorder, said coupling means connecting said first gauge means to said recorder at the commencement of a scan and for the first 180 degrees of chart movement thereafter and connecting said second gauge means to said recorder for the last 180 degrees of chart movement, said recorder having means responsive to said control means for indexing the recorder marker to a new position after each back-and-forth scan by said first and second gauge means of the respective sheet sections, to present a plurality of circular traces on said recorder representing the profile of said bubble during successive periods of time.

13. A method of utilizing information from two or more gauges that measure a property of adjacent, cross-machine direction sections of a product, said product being formed by a machine having an adjustment for uniformly changing the property in the machine direction, comprising the steps of:
  scanning said sections in the cross-machine direction with separate gauges, and
  controlling said machine adjustment in response to the average of the combined measurements from said gauges to maintain a desired machine direction property.

14. Apparatus for presenting information on a property of adjacent sections of a product, comprising:
  at least two gauges, each of said gauges producing a signal that is a function of said property,
  means for scanning a different one of said sections with each of said gauges,
  an indicator means for presenting an input signal as a function of time, and
  means responsive to the position of said gauges for sequentially transmitting the measurements from said gauges to said indicator means input to present a continuous visual indication of the property profile across said adjacent section of said product.

15. A method of presenting profile information on a product having adjacent sections across the width of said product from two gauges that measure a property of said product, comprising the steps of:
  scanning across the width of each of said product sections with separate gauges,
  sequentially presenting the measurements from said gauges on a display device to indicate a continuous visual indication of the property profile across said product width sections.

16. Apparatus for presenting profile information on adjacent sections across said product width, comprising:
  at least two gauges, each of said gauges producing a signal that is a function of said property,
  means for scanning a different one of said sections with each of said gauges across said product width,
  an indicator means for displaying an input signal as a function of time, and
  means responsive to the position of said gauges and said gauge signals for sequentially displaying the measurements from said gauges on said indicator means to present a continuous visual indication of the property profile across said product width sections.

17. A method of presenting profile information on a product from two gauges that measure a property of said product, said product being produced by a machine that forms said product into at least two separate sections across the width of said product, comprising the steps of:
  scanning across the width of each of said product sections with separate gauges, sequentially presenting the measurements from said gauges on a display device to indicate a continuous visual indication of the property profile across said product width sections.

18. Apparatus for presenting profile information on a product, said product being produced by a machine that forms said product into at least two separate sections across the width of said product, comprising:
at least two gauges, each of said gauges producing a signal that is a function of said property,
means for scanning a different one of said sections with each of said gauges across said product width,
an indicator means for displaying an input signal as a function of time, and
means responsive to the position of said gauges and said gauge signals for sequentially displaying the measurements from said gauges on said indicator means to present a continuous visual indication of the property profile across said product width sections.

References Cited
UNITED STATES PATENTS

| | | | |
|---|---|---|---|
| 2,909,660 | 10/1959 | Alexander | 18—2 |
| 3,006,225 | 10/1961 | Mamas | 18—2 |
| 3,015,129 | 2/1962 | Hays et al. | 18—2 |
| 3,160,917 | 12/1964 | Berggren et al. | 18—14 |
| 3,190,261 | 6/1965 | Jeffer | 18—2 |
| 3,212,127 | 10/1965 | Flook et al. | 18—2 |
| 3,307,215 | 3/1967 | Gerhard et al. | 18—2 |
| 3,311,947 | 4/1967 | Fenley | 18—2 |

WILLIAM J. STEPHENSON, *Primary Examiner.*